Sept. 2, 1941. J. B. BROCK 2,254,208
DISPENSING APPARATUS
Filed Jan. 9, 1939 7 Sheets-Sheet 1
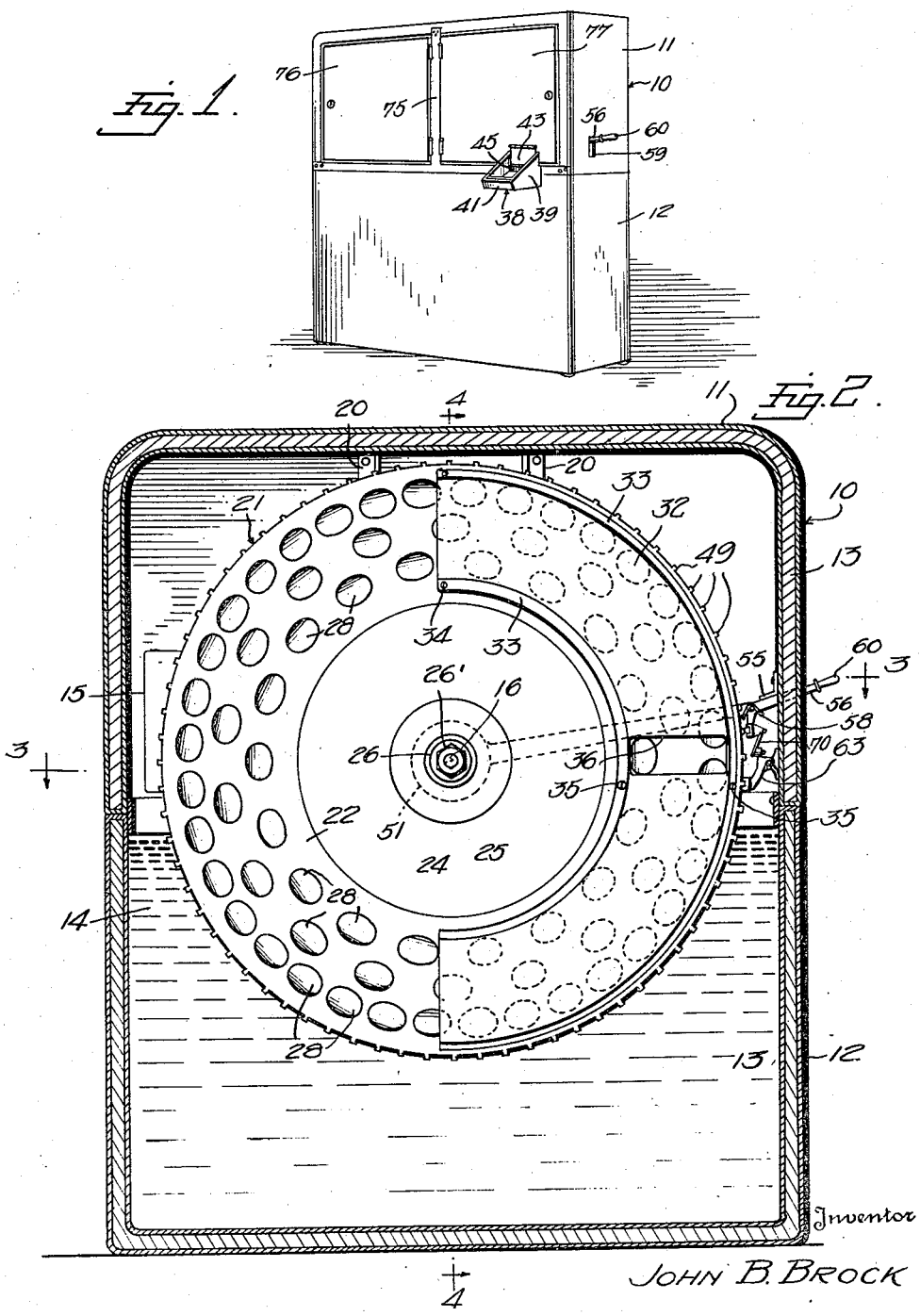
Inventor
JOHN B. BROCK
By C. L. Parker
Attorney Sept. 2, 1941. J. B. BROCK 2,254,208
DISPENSING APPARATUS
Filed Jan. 9, 1939 7 Sheets-Sheet 2
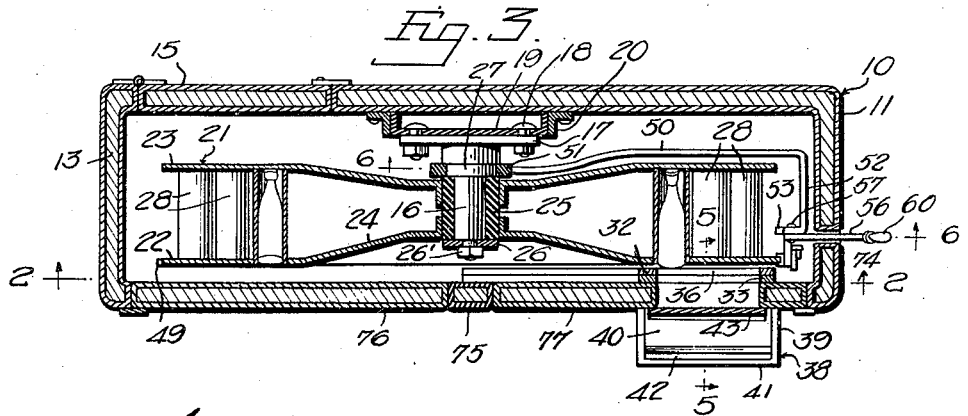
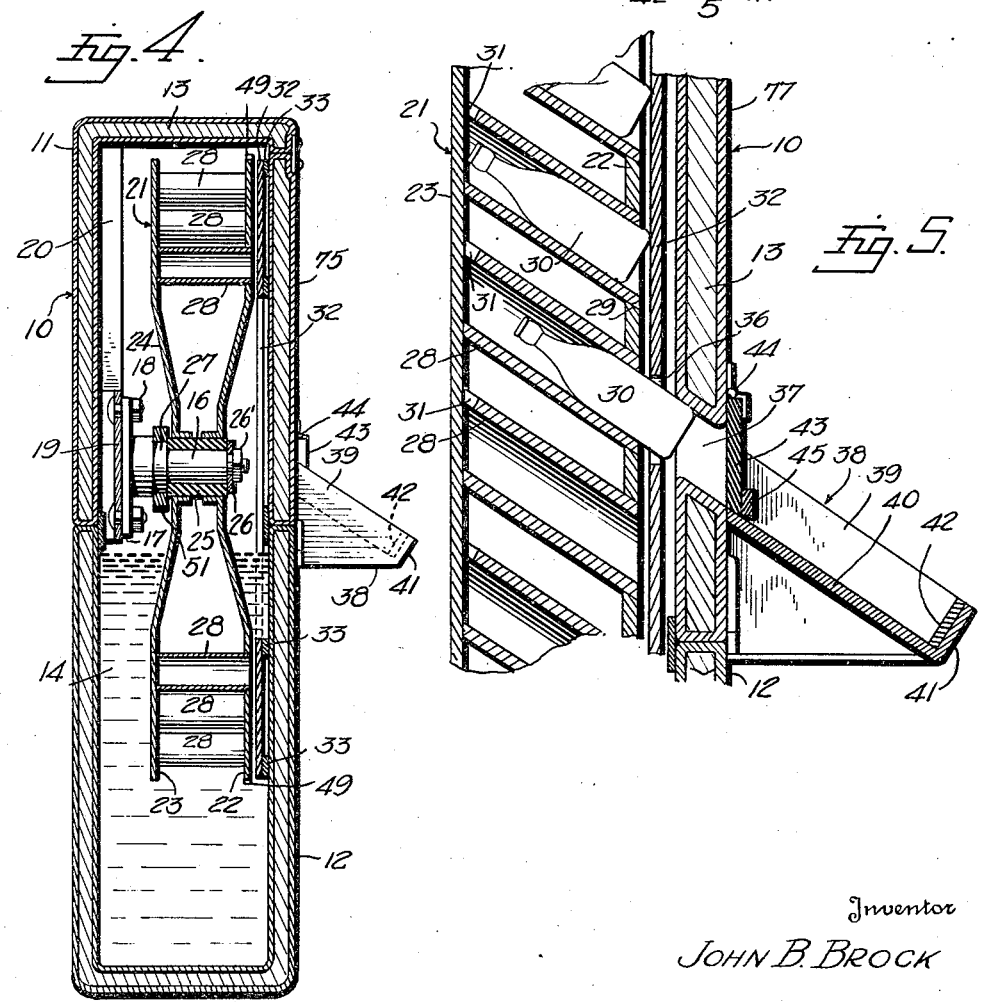
Inventor
JOHN B. BROCK

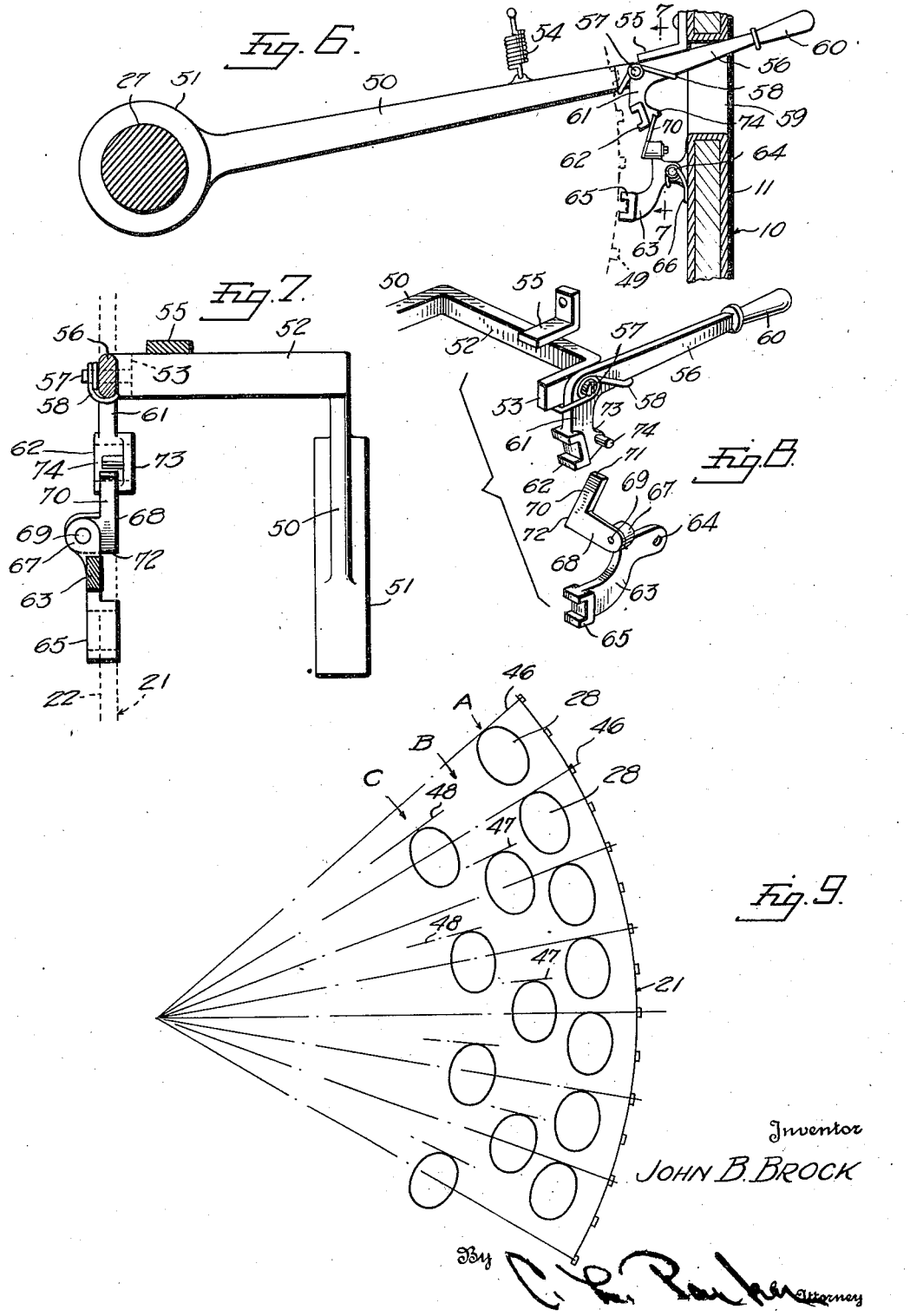

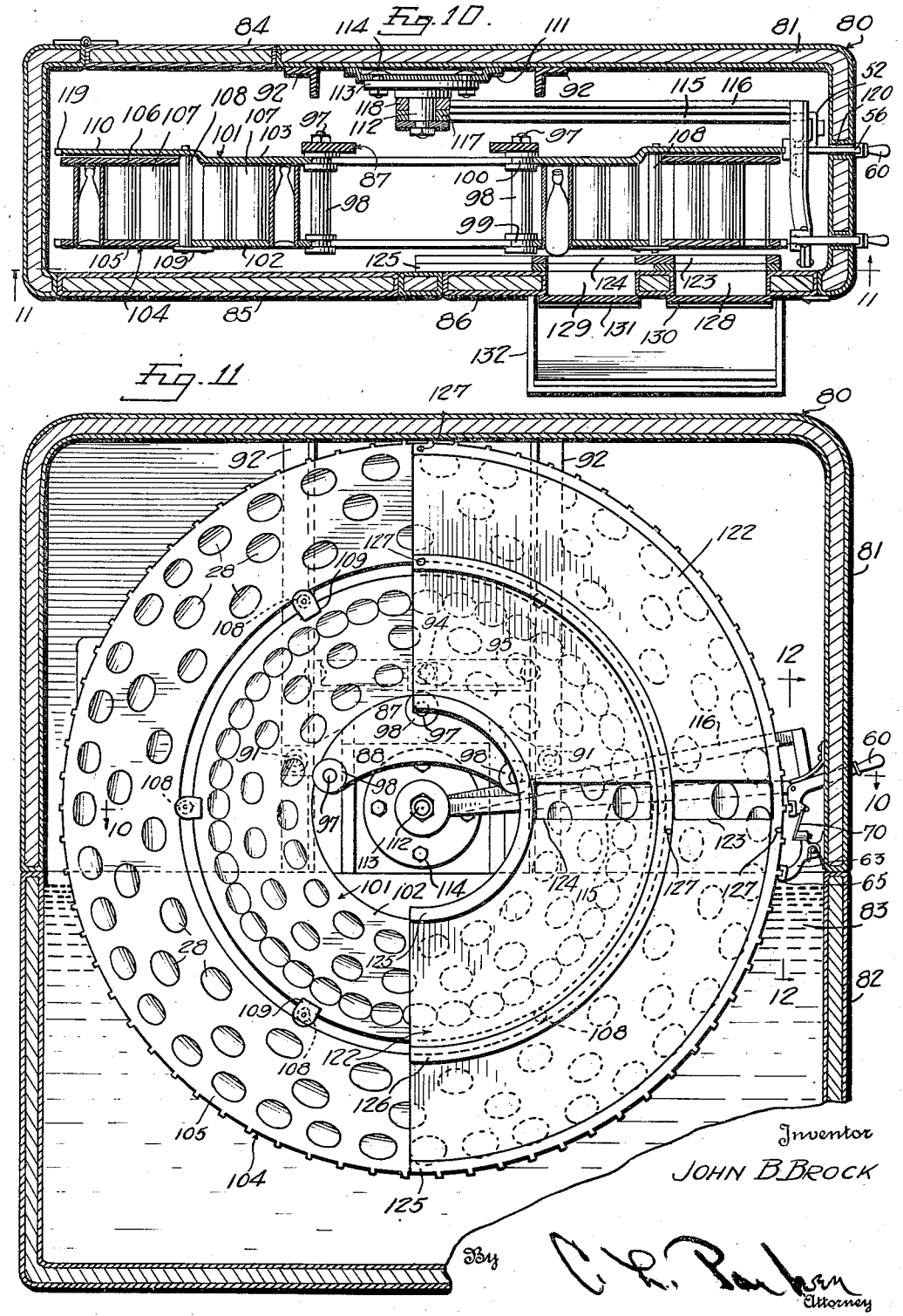

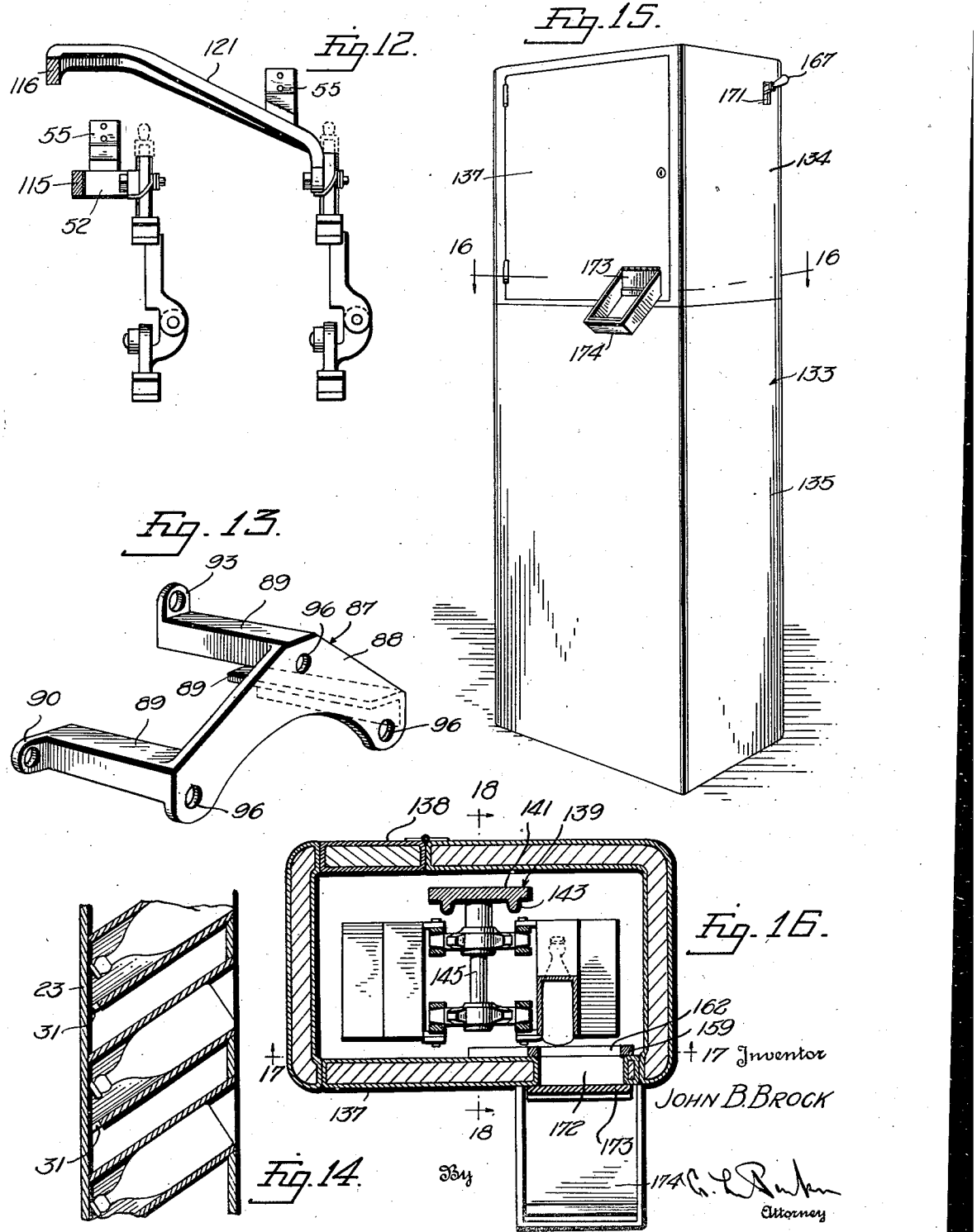

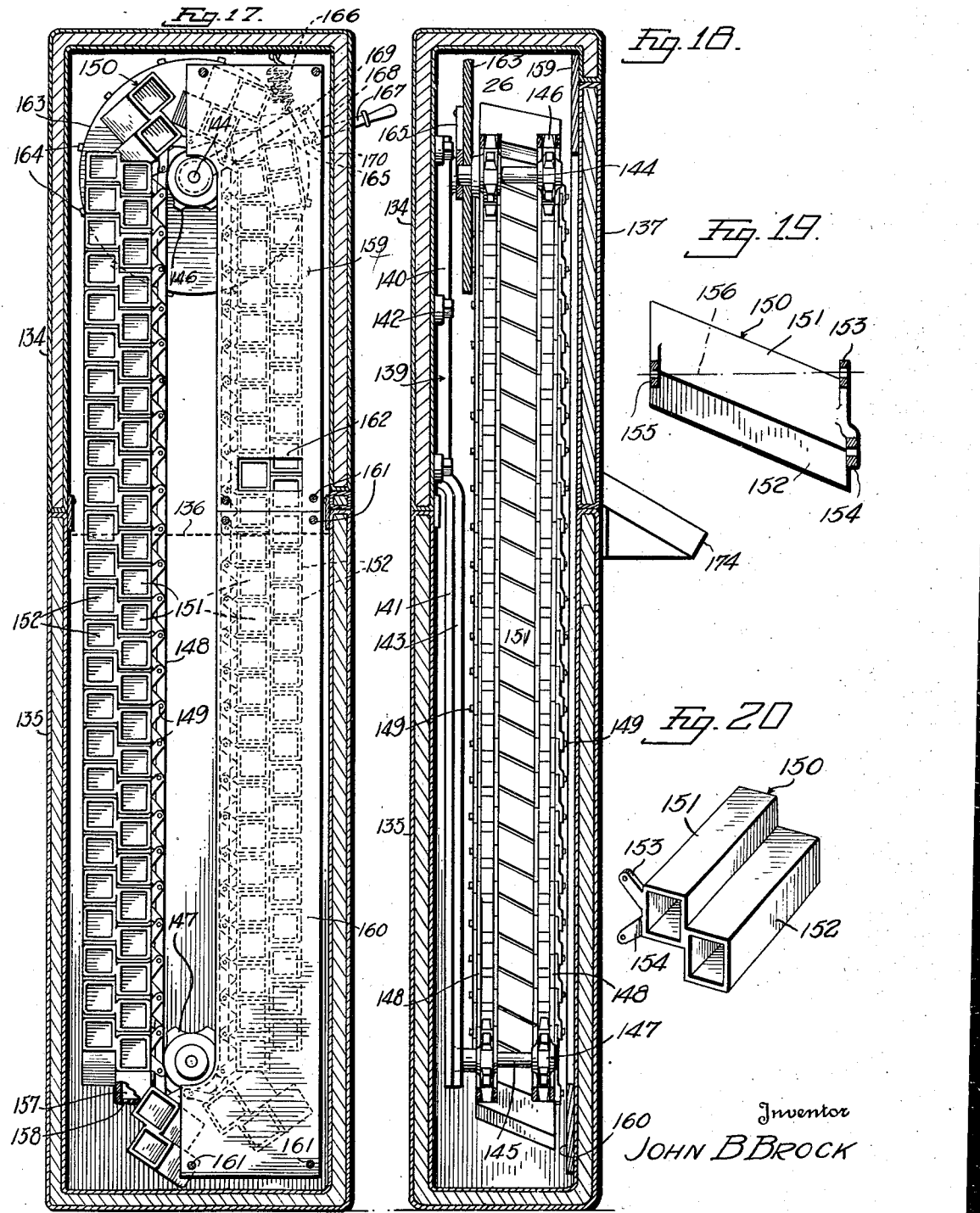

Sept. 2, 1941.    J. B. BROCK    2,254,208
DISPENSING APPARATUS
Filed Jan. 9, 1939    7 Sheets-Sheet 7
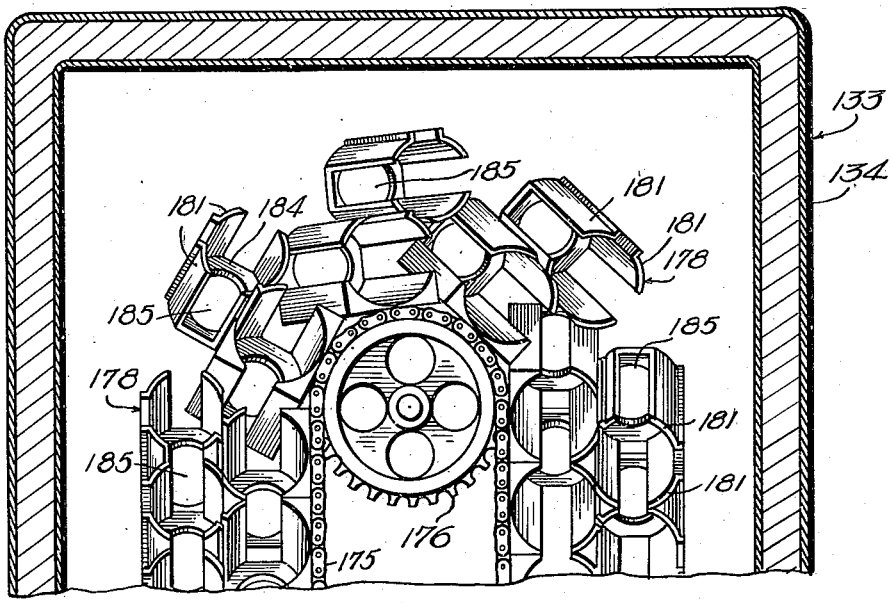
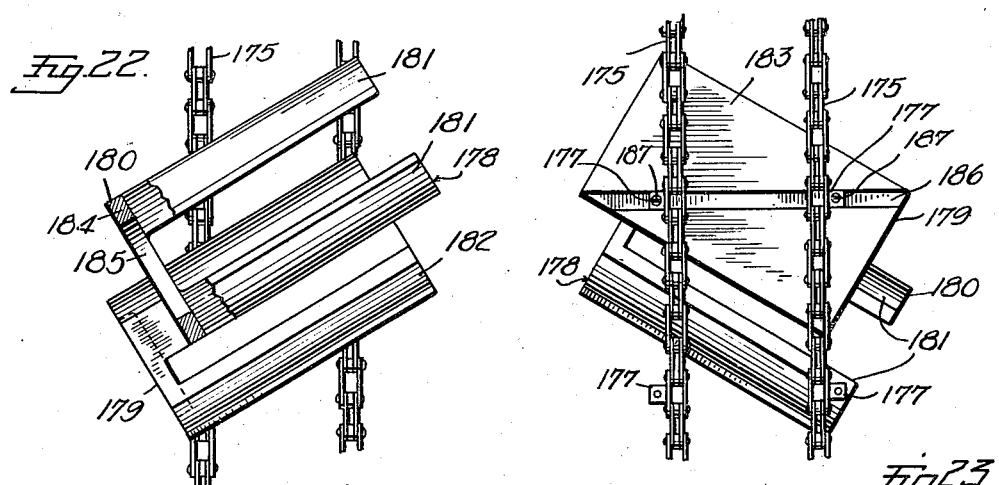
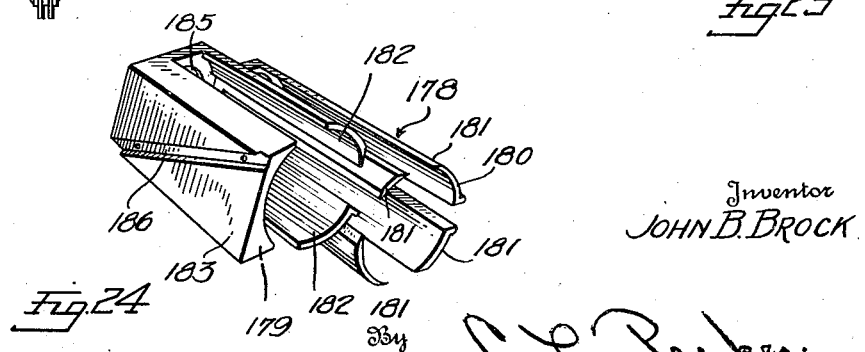
Inventor
JOHN B. BROCK Patented Sept. 2, 1941

2,254,208

UNITED STATES PATENT OFFICE 2,254,208

DISPENSING APPARATUS

John Buford Brock, Charlotte, N. C., assignor, by mesne assignments, to Jessie Mae Hatchel Cutler Application January 9, 1939, Serial No. 250,044

8 Claims. (Cl. 312—36)

This invention relates to dispensing machines, and more particularly to an apparatus for dispensing refrigerated bottles of soft drinks and the like.

An important object of the invention is to provide a simplified type of apparatus particularly adapted for dispensing articles such as bottles of soft drinks wherein a maximum number of the articles may be contained in a machine having a minimum number of structural and operating parts.

A further object is to provide a dispensing apparatus having a dispensing opening, and wherein the articles, when they reach such opening, are supported in a position to be discharged through the opening by gravity.

A further object is to provide a carrier or conveyor for the bottles or other articles having article holders inclined with respect to the horizontal as the holders approach and reach the discharge opening, whereby the bottles or other articles, as they successively reach such opening, will move therethrough by gravity.

A further object is to provide a carrier or conveyor for the bottles wherein the lower portion of the carrier or conveyor may be conveniently immersed in cold water and wherein the dispensing opening through the casing is arranged above the water line to prevent any loss of water therethrough.

A further object is to provide an apparatus of the character just referred to wherein the carrier or conveyor is constructed to drain water from the individual bottle holders and wherein the dispensing opening in the casing is arranged at a point remote from the refrigerating liquid in point of travel from the liquid to the dispensing opening whereby the bottles may be delivered to the customer in a dry condition.

A further object is to provide a novel staggered relation of the article holders to provide for the carrying and dispensing of a maximum number of articles for a machine of a given size.

A further object is to provide a novel form of cabinet or casing having a bottom portion adapted to contain a refrigerating liquid and an upper portion which carries and supports the article carrier or conveyor in such a manner as to permit all of the mechanism to be bodily removed from the apparatus by lifting the top portion of the casing.

A further object is to provide an apparatus which lends itself particularly well to the use of conveying chains for supporting the article or bottle holders, thus permitting a large number of articles to be carried in an apparatus which is relatively narrow and occupies correspondingly little floor space.

A further object is to provide mechanism for actuating the article carrier or conveyor in successive steps to dispense successive articles or bottles and wherein such mechanism is prevented from moving the carrier or conveyor beyond its intended successive positions.

A further object is to provide such an apparatus having means for normally locking the article carrier or conveyor against movement, thus positively holding it against movement due to the overbalancing of the carrier or conveyor when more bottles or articles are arranged on one side thereof than on the other side.

A further object is to provide a novel form of article holder particularly adapted to be carried by vertical chains, and wherein each article holder carries two articles in staggered relation with respect to each other and with respect to the articles of the adjacent article holders to facilitate the successive discharging of articles with a minimum linear movement of the supporting chains.

A further object is to provide such an article holder particularly designed for dispensing bottles of circular cross-section and wherein the pockets for the bottles of each article holder slightly overlap with relation to each other to minimize the width of the article holder.

Other objects and advantages of the invention will become apparent during the course of the following description.

In the drawings I have shown several embodiments of the invention. In this showing:

Figure 1 is a perspective view of one form of apparatus as a whole,

Figure 2 is a vertical sectional view taken parallel to the front wall of the apparatus, substantially as indicated by the line 2—2 in Figure 3, Figure 3 is a horizontal sectional view taken substantially on line 3—3 of Figure 2, Figure 4 is a central vertical sectional view on line 4—4 of Figure 2, Figure 5 is an enlarged fragmentary vertical sectional view on line 5—5 of Figure 3, Figure 6 is an enlarged fragmentary sectional view of the lever operating mechanism, taken substantially on the line 6—6 of Figure 3, Figure 7 is an enlarged fragmentary sectional view on line 7—7 of Figure 6, Figure 8 is a detail perspective view of a portion of the lever mechanism, some of the parts being shown separated, Figure 9 is a diagrammatic face view of a portion of the article carrier showing the relative arrangement of the individual article pockets or holders, Figure 10 is a horizontal sectional view similar to Figure 3 showing a modified form of apparatus having two article carriers for dispensing two different kinds of articles or beverages, the view being taken substantially on line 10—10 of Figure 11, Figure 11 is a vertical sectional view of the same, similar to Figure 2 and taken on line 11—11 of Figure 10, Figure 12 is an enlarged fragmentary sectional view taken substantially on line 12—12 of Figure 11, Figure 13 is a detail perspective view of the supporting bracket for the article carriers, Figure 14 is an enlarged detail sectional view through an article carrier of either of the forms of the invention shown in the preceding figures, showing the means for draining water from the article holders at the upwardly moving side of the article carriers, Figure 15 is a detail perspective view of a modified form of apparatus employing a chain-type article carrier or conveyor, Figure 16 is a horizontal sectional view of the same taken substantially on line 16—16 of Figure 15, Figure 17 is a vertical sectional view on line 17—17 of Figure 16, Figure 18 is a similar view on line 18—18 of Figure 16, Figure 19 is an enlarged side elevation of one of the article holders having the supporting ears thereof shown in section to indicate the relative positions of the supporting pins, Figure 20 is a detail perspective view of one of the article holders, Figure 21 is an enlarged fragmentary sectional view similar to the upper end of Figure 17 showing a modified form of chain type article holder, Figure 22 is a fragmentary side elevation of one of the article holders looking at the side thereof opposite the supporting chains, Figure 23 is a similar view of the chain side of the article holder showing the connection of the chain thereto, and, Figure 24 is a detail perspective view of one of the article holders.

Referring to Figures 1 to 4 inclusive, the numeral 10 designates the casing of the apparatus as a whole comprising upper and lower sections 11 and 12 preferably of double walled construction insulated as at 13. The bottom casing section 12 forms a container for a cooling liquid 14 preferably to a level slightly below the line of division between the upper and lower casing sections. It will be obvious that the liquid 14, which is preferably water, may be cooled with cracked ice or by any suitable mechanical refrigerating apparatus. In the present instance the upper casing section 11 has been shown (Figure 3) as being provided with an ice door 15 through which cracked or crushed ice may be introduced into the casing.

Referring to Figures 2, 3 and 4, the numeral 16 designates a relatively heavy stub shaft having a base 17 bolted as at 18 to a support 19 fixed in any suitable manner with respect to the rear wall of the upper casing 11. For this purpose, such wall of the upper casing is shown as being provided with angle iron or similar members 20 preferably extending from the top of the upper casing to a point adjacent the line of division between the two casing sections, the support 19 being welded or otherwise secured to the members 20. These members act as reinforcing members for the rear wall of the upper casing and serve to distribute and thus effectively carry the load of the article carrier to be described, which is supported by the stub shaft 16.

The carrier for the bottles is indicated as a whole by the numeral 21 and is preferably circular as shown in Figure 2. The carrier, in the particular embodiment illustrated, comprises front and rear plates 22 and 23 having their radially inner portions tapered inwardly toward each other as at 24, and secured as by welding or the like to a hub 25 rotatably supported by the stub shaft 16. A washer 26 is held in position on the forward end of the stub shaft 16 by a nut 26' to prevent movement of the carrier in one direction on the stub shaft, the rear end of the hub 25 engaging a shoulder formed by an enlarged cylindrical portion 27 of the stub shaft. The enlarged portion 27 of the stub shaft serves an additional purpose, as will be described.

The carrier 21 is provided with a substantial number of article holders 28 shown in the present instance as being cylindrical and as being arranged in a plurality of rows designated as A, B and C, although it will become apparent that a greater number of rows may be employed if desired. The relationship between the article holders of the different rows is important and will be referred to in detail later.

The article holders are arranged at an angle to the axis of the article carrier and it will be apparent that at the top and bottom of the article carrier the holders will be arranged in horizontal planes while at the sides of the article carrier the holders will be inclined from the horizontal as shown in Figures 5 and 14. The article carrier rotates in a step by step movement in a manner to be described in a clockwise direction as viewed in Figure 2 and accordingly the article holders at the right hand side of Figure 3 and in Figure 5 are at the downwardly moving or discharging side of the carrier. In Figure 5, therefore, the article holders are inclined downwardly toward the front wall of the upper casing section 11. It will be noted that the forward plate 22 of the article carrier is formed with openings 29 corresponding in shape and size to the article holders in their inclined position, and the forward ends of the article holders project through these openings. In Figure 5, bottles 30 have been shown in two of the article holders and it will be apparent that on the descending side of the carrier the bottles are free to slide from the holders, so far as the article carrier itself is concerned, means to be described being provided to prevent the bottles on the descending side of the carrier from sliding from the article holders except at the dispensing point.

The rear plates 23 of the article carrier may be imperforate, if desired, and adjacent the rear plate, each article holder, if in the form of a cylinder, as shown, may be provided with a drain opening 31, these openings occurring in the lowest point in the article holders on the ascending side of the carrier 21 to drain water from the article holders. Any water which possibly may remain on the bottles or in the article holders when the descending side of the carrier is reached may drain from the open ends of the holders.

So far as the article carrier itself is concerned, the bottles are free to slide from the article holders at the descending side of the carrier, and means is provided for preventing such movement of the bottles except at the dispensing point. Referring to Figures 2 to 5 inclusive, the numeral 32 designates an arcuate plate of a width sufficient to engage bottles in all three of the rows A, B and C on the descending side of the carrier, the plate 32 being arcuate and concentric with the carrier as shown in Figure 2. The plate 32 extends from the top to the bottom of the carrier, but its use on the ascending side of the carrier is unnecessary since the bottles during such portion of the travel of the carrier gravitate toward the rear plate of the carrier as shown in Figure 14. The retaining plate 32 may be reinforced at its edges as at 33 and may be secured at the top to the front wall of the upper casing 11 as at 34. The retaining plate is also secured to the front wall of the upper casing section, just above the lower edge thereof, as at 35. The portion of the retaining plate which lies within the lower casing section is not secured to the latter, but the reinforcing strips 33 contact therewith as shown in Figure 4. Therefore, all portions of the retaining plate are fixed against movement away from the bottle carrier, but the plate is carried solely by the upper casing section 11 and is removable therewith.

Approximately in the horizontal plane of the axis of the stub shaft 16, the retaining plate 32 is provided with an opening 36 embracing all three rows of bottle holders so that a bottle in each holder will be released therefrom as the forward end of the holder comes into full registration with the opening 36. The front wall of the upper casing section 11 is provided with an inclined opening 37 and it will be apparent from Figure 5 that this opening is inclined to correspond to the inclination of the bottle holders 28 at the dispensing side of the apparatus. It also will be apparent that the openings in the bottle holders, the opening 36 in the retaining plate and the opening 37 are aligned as each bottle holder moves into dispensing position. Therefore, as each bottle moves into dispensing position it will slide from its holder and through the openings 36 and 37.

A bottle receiver 38 is arranged to receive bottles dispensed through the opening 37. This receiver includes side walls 39, a bottom wall 40 and an end wall 41 (Figures 1, 3 and 5), and the end wall is preferably provided with a resilient pad 42. The side walls 39 extend rearwardly to engage the front wall of the bottom casing section 12 to effectively brace the receiver, but they are not secured to such wall. Therefore it will be apparent that the receiver is secured solely to the upper casing section and accordingly is movable therewith upon removal thereof. The receiver is of a width sufficient to receive bottles from all of the rows A, B and C, as indicated in Figure 3. The inclination of the bottle holders at the dispensing point is sufficient to assure the gravitational discharge of the bottles but is not sufficient to cause such rapid movement of the bottles as to present any danger of breakage thereof. Any possibility of breakage, however, is eliminated by the use of the resilient pad 42.

The casing of the apparatus is insulated, as stated, and accordingly the refrigerated water 14 retains the air thereabove at a relatively low temperature. In order to prevent any entrance of warm air into the container, the opening 37 is provided with a door 43 hinged at its upper edge as at 44 to the front wall of the upper casing section 11. The door 43 is preferably formed of relatively thick insulating material such as fiber board or the like, and the door is preferably weighted at its lower edge as at 45 to insure the snug closing thereof.

Means to be described are provided for rotating the carrier through a step by step movement to discharge successive bottles through the opening 37, and the arrangement of the article holders in the respective rows is such as to provide the machine with a maximum capacity for a carrier of a given size with the successive steps of the carrier equal in length. Referring to Figure 9, it will be apparent that the article holders of the row A are arranged relatively close together and on an arc of a circle concentric with the axis of rotation of the carrier. In the present embodiment of the invention the article holders of the row A have been shown as being thirty-six in number and accordingly lines 46 (Figure 9) drawn radially from the axis of rotation of the carrier through the ends of the respective ellipses defined by the open ends of the article holders will be 10 degrees apart. The lines 46 pass through the upper limits of the ellipses of the open ends of the article holders on the descending side of the carrier, and thus correspond to the point which must move downwardly to a point coinciding with the upper limit of the opening 36 before a bottle will be free to move through such opening.

The angles between alternate pairs of lines 46 are bisected by lines 47 to locate the upper limits of the ellipses of the open ends of the holders 28 of the row B as viewed in Figure 9. The remaining angles between the lines 46 are bisected by lines 48 to locate the corresponding points with respect to the holders of the row C. Accordingly it will be apparent that exactly half way between each successive pair of radial lines 46, an opening of either the row B or the row C will come into full registration with the dispensing opening 36 of the retaining plate.

In other words, the radial lines 46 in the embodiment of the invention illustrated are 10 degrees apart while a bottle will be discharged from a holder of either row B or row C half way between the discharge points of each pair of adjacent holders of row A. Therefore, upon each turning movement of 5 degrees of the carrier 21 a bottle will be dispensed from either one of the three rows. It also will be apparent that the total number of article holders in rows B and C equals the number of bottle holders in the row A. In the embodiment of the invention illustrated the row A contains thirty-six bottle holders and accordingly the apparatus as a whole is provided with holders for seventy-two bottles.

Suitable mechanism is provided for advancing the carrier in a step by step movement. The periphery of the carrier plate 21 is provided with outstanding lugs 49 spaced 5 degrees apart in the present embodiment of the invention. These lugs may be formed integral with the plate 22 as will be apparent. A lever 50 is operable for moving the carrier by engagement of suitable mechanism with the lugs 49. The lever 50 is provided with a hub 51 rotatably surrounding the enlargement 27 of the stub shaft 16. The lever extends rearwardly of the carrier as shown in Figure 3 and thence forwardly as at 52 and the free end of the lever is turned inwardly as at 53. A suitable tension spring 54 (Figure 6) is connected to the lever to urge it upwardly, and a stop member 55, carried by the end wall of the upper casing section 11, engages the forwardly projecting portion of the lever 52 to limit upward movement of the lever.

An operating lever 56 is pivotally connected as at 57 to the end 53 of the lever 50 and a torsion spring 58 is connected between the two levers to tend to turn the operating lever 56 in a counter-clockwise direction as viewed in Figure 6. The operating handle 56 projects through an opening 59 in the end wall of the top casing section 11 and the upper limit of the opening 59 limits turning movement of the handle lever 56 for a purpose to be described. The outer end of the lever 56 is provided with a suitable handle 60 to be grasped by the operator.

The operating lever 56 is provided with a depending arm 61 at its inner end terminating in a substantially U-shaped operating member 62 engageable with successive lugs 49 to effect turning movement of the carrier. Downward movement of the handle 60 turns the lever about the pivot 57 to engage the member 62 with one of the lugs 49, and when swinging movement of the lever 56 is limited by engagement of the member 62 with the edge of the carrier or with a lug 49, continued downward movement of the handle 56 effects turning movement of the carrier. Under such conditions it will be apparent that the levers 50 and 56 and the carrier turn as a unit about the axis of the stub shaft 16.

Means are provided for normally preventing turning movement of the carrier and for preventing the carrier from overrunning at the end of each step in its movement. Referring to Figures 2, 6, 7 and 8, the numeral 63 designates a locking dog pivoted at one end as at 64 to the adjacent end wall of the upper casing 11. The other end of the locking dog is provided with a U-shaped engaging member 65 similar in shape to the member 62, and engageable with successive lugs 49. A torsion spring 66 tends to turn the dog 63 in a counter-clockwise direction, thus tending to maintain the member 65 in engagement with one of the lugs 49.

The dog 63 is provided with an ear 67 to which an operating element 68 is pivotally connected as at 69. The operating element is provided with a vertically extending engageable portion 70 offset from the body of the dog 63 and having parallel upper and lower ends 71 and 72 spaced apart a predetermined distance for a purpose to be described. The pivot means 69 preferably frictionally holds the operating element 68 in the normal position shown in Figures 7 and 8, there being no force imparted to the member 68 to tend to turn it about its pivot member. However, the operating element 68 is adapted to be manually turned out of operative position to permit the carrier to be rotated freely when desired, for example, when it is being filled with bottles. The portion 70 of the element 68 is normally inclined as shown in Figures 2, 6 and 8, for a purpose to be described.

The depending end 61 of the lever 56 is provided outwardly of the member 62 with respect to the carrier with a flange 73, offset from the plane of the member 70 as shown in Figure 7, and provided with a laterally extending pin 74. Upon downward movement of the lever 56 the pin 74 engages the member 70 to swing the U-shaped member 65 out of engagement with one of the lugs 49 as the member 62 swings into engagement with one of the lugs 49, and thus the carrier is released to be turned by the member 62. The handle 56 is moved downwardly to turn the carrier and when the latter has been turned a sufficient arc to complete one step in its movement, the pin 74 will pass beneath the lower end 72 of the member 70, and the spring 66 will snap the member 65 into engagement with the next higher lug 49. A bottle will then be dispensed from the machine and the lever 56 will be released for upward movement with the lever 50 by the spring 54. The pin 74 will ride upwardly over the inner face of the member 70 until the pin reaches the upper end 71 of the member 70, whereupon the pin 74 will swing back to its position shown in Figure 6. This operation takes place adjacent the upper limit of movement of the lever 50. When such limit of movement is reached, the arm 52 (Figures 3 and 8) will engage the stop 55 and the spring 58 will turn the lever 56 until it engages the top of the opening 59 (Figure 6).

The foregoing description covers all of the structure and operating elements necessary for controlling the apparatus. It will be apparent that the designs of the various parts may be varied widely from the designs shown both in the structure of the interior parts and in the design and structure of the casing. For example, it will be apparent that the casing may be of any suitable shape and that it may be provided with suitable doors to provide access thereto, the construction as illustrated, in fact, being shown with its front wall formed with a central dividing member 75 with doors 76 and 77 on opposite sides thereof, the door 77 forming the portion of the front wall of the upper casing section through which the opening 37 is formed and to which the bottle receiver 38 is connected. These doors obviously provide access to the operating mechanism, as well as to the bottle holders for the purpose of filling the latter.

A somewhat modified form of the invention is shown in Figures 10 to 13 inclusive wherein two carriers are employed to provide for the dispensing of two different kinds of articles, such as two flavors or brands of soft drinks. The modified form of the invention comprises a casing indicated as a whole by the numeral 80 and formed quite similar to the casing previously described, the casing 80 including upper and lower casing sections 81 and 82 the latter of which contains the refrigerant 83. The upper casing section 81 may be provided with a rear ice door 84 and a pair of front doors 85 and 86, similar to the doors 76 and 77 previously described.

Since the form of the invention shown in Figures 10 to 13 inclusive is adapted to employ two or more article carriers, a single supporting shaft, such as the shaft 16 previously described, cannot be employed. A modified supporting means accordingly is employed and is of such character as to permit the bodily removal of the carriers without having to loosen any fastening means such as the nut 26' (Figure 4). As shown in Figure 13 a supporting bracket indicated as a whole by the numeral 87 is adapted to support the weight of the carriers in a manner to be described. The bracket 87 is preferably integral and comprises a three-cornered base plate 88 from each corner of which projects horizontal legs 89, as clearly shown in Figure 13. The two lower legs 89 are provided with out-turned lips 90 apertured to receive bolts 91 (Figure 11) for securing the lower legs of the bracket to vertically extending angle iron or similar members 92, these members being welded or otherwise secured to the back wall of the upper casing section 81 and serving to distribute the weight of the carriers throughout such wall of the casing in the same manner as the angle iron members 20 previously described. The upper leg 89 also is provided with a lip 93 apertured to receive a bolt 94 to secure it to a transverse brace 95 (Figure 11) secured at its ends to the angle iron members 92.

Adjacent each corner, the base plate 88 is provided with openings 96 to receive and support the shafts 97 on each of which is supported a roller 98. These rollers are respectively provided on their inner and outer ends with grooves 99 and 100, the grooves 99 being arranged in one vertical plane and the grooves 100 in another vertical plane spaced therefrom for a purpose to be described. The rollers 98 are adapted to support an inner carrier indicated as a whole by the numeral 101. This carrier has front and rear plates 102 and 103 the radially inner edges of which engage the respective grooves 99 and 100. In this connection it will be noted that the lower rollers 98 are arranged a substantial distance above the horizontal axis of rotation of the inner carrier. This construction is employed so that all three of the rollers 98 will definitely carry portions of the load which obviously would not be true if the lower rollers were arranged in the horizontal plane of the axis of rotation. Moreover, the lower rollers are arranged at points in which the widths of the openings formed by the inner edges of the plates 102 are less than the diameter of such openings. This arrangement permits the carrier 101 to be lifted vertically until the lower rollers are arranged approximately in the vertical plane of the axis of the openings defined by the inner edges of the plates 102 and 103, whereupon the carrier 101 may be withdrawn horizontally from the front of the apparatus.

A second carrier indicated as a whole by the numeral 104 surrounds the carrier 101 concentric therewith. The carrier 104 comprises forward and rear plates arranged in the respective vertical planes of the plates 102 and 103. It will be apparent that both of the carriers referred to may be identical with the carrier 21 as to the means for carrying articles, both carriers being provided with tubes 107 for receiving and holding bottles or other articles, these tubes opening through the forward plates 102 and 105 in the same manner as shown in Figure 5 and being provided with drainage openings as indicated by the numeral 31 in Figure 14.

The adjacent edges of the plates 102 and 105 and 103 and 106 are circular and concentric and are spaced apart as shown in Figure 11 to receive a plurality of rollers 108 therebetween. These rollers are provided with reduced ends and one end of each roller is rotatably supported in a clip 109 secured to the plate 102, as shown in Figures 10 and 11. The reduced rear ends of the rollers 108 are suitably journalled in a plate 10 preferably formed integral with the plate 103 and offset rearwardly of the plate 106, as clearly shown in Figure 10. The plate 110 is circular and movement is imparted therethrough to rotate the carrier 101 in a manner to be described.

A support 111 (Figure 10) is welded or otherwise secured to the inner face of the back wall of the upper casing section 81. A stub shaft 112 is arranged coaxially with the carriers 101 and 104 and is provided with a flange 113 bolted as at 114 to the support 111. A pair of levers 115 and 116 are provided for actuating the carriers and these levers are respectively provided with collars 117 and 118 supported by the stub shaft 112, as shown in Figure 10. The lever 115 is employed for rotating the carrier 101 in a step by step movement and this lever and all of the mechanism associated therewith are identical with the lever 50 and the actuating and locking mechanism associated therewith. Therefore, parts of such mechanism have been indicated by the same reference numerals as the corresponding parts of the form of the invention previously described, the only distinctions between the two mechanisms being that the body of the lever 115 is straight as shown in Figure 10, while the lever 50 has its inner end slightly offset as shown in Figure 3, while the lateral extending portion 52 of the lever in Figure 10 is somewhat shorter than the corresponding portion 52 of the lever shown in Figure 3. The peripheral edge of the plate 110 is provided with lugs 119 corresponding to the lugs 49 previously described. It will be apparent that the mechanism associated with the lever 115 includes the handle lever 56 which projects through an opening 120 formed in the casing section 81 in the vertical plane of the plate 110.

An almost identical mechanism is associated with the lever 116 for operating the outer carrier 104. In the normal position of the two main levers 115 and 116 shown in Figure 11, it will be apparent that the lever 116 extends upwardly at a substantial angle toward the adjacent side of the casing 81. Instead of the straight transverse portion 52, the transverse portion of the lever 116 is shaped as shown in Figure 12 and such portion of the lever is indicated by the numeral 121. This structure is provided in order that the lever 116 may have space enough to move downwardly upon actuation of the mechanism associated with this lever through which the outer carrier 105 is actuated. Aside from the distinction noted, the operating mechanism for the carrier 104 is identical with the other actuating mechanisms associated with the lever 115 and with the lever 50, and the parts of the mechanism associated with the lever 116 have been indicated by the same reference numerals.

An arcuate plate 122 similar to the plate 32 is employed as the retaining plate and is provided with a pair of horizontally elongated openings 123 and 124 as shown in Figures 10 and 11. The opening 123 embraces all three rows of the article holders of the carrier 104, while the opening 124 embraces all three rows of article holders of the carrier 121. The plate 122 may be provided with inner and outer arcuate reinforcing members 125 and a similar reinforcing member 126 intermediate its width. The plate 122 is secured to the reinforcing elements 125 and 126 throughout the length of the latter, and the plate and its reinforcing elements are secured by screws or the like 127 to the front wall of the casing section 81, all of these fastening elements lying below or to one side of the door 86. It will be apparent that the retaining plate 122 is not secured to the lower casing section 82, although the reinforcing elements 125 and 126 contact with the inner face of the front wall of the lower casing section, and accordingly it will be apparent that the plate 122 as well as the carriers 101 and 104 and the operating mechanisms therefor may be bodily lifted from the lower casing section 82 with the upper casing section 81.

As shown in Figure 10, the door 86 is provided with a pair of openings 128 and 129 for the discharge of bottles passing through the respective openings 123 and 124. The openings 128 and 129 are respectively provided with doors 130 and 131, and the bottles discharged through the openings 128 and 129 slide into a receiver 132. The openings 128 and 129, the doors 130 and 131 and the receiver 132 may be of the same shapes and structures as the corresponding elements previously described except that the receiver 132 obviously will be wider than the receiver 38 to catch bottles discharged through either of the openings 128 or 129.

A further modified form of the invention is shown in Figures 15 to 19 inclusive. Such form of the invention is highly desirable in actual practice because of the substantial number of articles which it will handle in an apparatus of minimum width. Instead of employing rotatable carriers, the form of the invention shown in Figures 15 to 20 inclusive employs an endless chain mechanism as the carrier, thus minimizing the width of the apparatus.

Referring to Figures 15 to 18 inclusive, it will be noted that the cabinet for the modified form of the invention is in the form of a casing indicated as a whole by the numeral 133, this casing being relatively narrow and comprising upper and lower sections 134 and 135, the latter of which may contain a refrigerant approximately to the level indicated by the numeral 136 in Figure 17. The upper casing section is provided with a door 137 through which access may be had to the mechanism to be described, and the back wall of the upper casing section may be provided with a door 138 for the introduction of cracked ice.

A main supporting bracket 139 is arranged within the casing and comprises upper and lower sections 140 and 141, as shown in Figure 18. The upper section 140 of the supporting bracket lies flat against the back wall of the upper casing 134 and is bolted thereto as at 142. The lower bracket portion 141 is offset inwardly as shown in Figure 18 and is wholly free from the lower casing 135. The bracket 139 may be ribbed throughout its length as at 143 (Figures 16 and 18) to provide the bracket with a high degree of rigidity. The upper bracket portion 140 extends throughout the greater portion of the height of the upper casing 134 and accordingly acts as a brace for the rear wall of such casing. It will become apparent that the bracket supports the weight of the carriers to be described and the articles carried thereby.

Upper and lower shafts 144 and 145 are rigidly carried by the upper and lower bracket portions 140 and 141 and these shafts respectively support pairs of sprockets 146 and 147 about which pass endless chains 148. Each chain is made up of identical links of the same number, and these links are connected by pivot pins 149, the chain being of any conventional type except that the pivot pins 149 thereof are extended from the remote faces of the chain for a purpose to be described.

The two chains referred to support a plurality of article holders one of which is shown in detail in Figures 19 and 20 and indicated as a whole by the numeral 150. Each article holder is formed of a pair of units 151 and 152 rigidly secured to each other in offset relation as shown in Figures 17 and 20. It will be apparent that the sprockets 147 rotate in a clockwise direction as viewed in Figure 17 and accordingly the right hand runs of the chains in such figure are the downwardly moving runs. As the article holders pass over the top of the upper sprockets, the respective units 151 and 152 form a pair of adjacent series of article holding pockets. Each unit 151 overlaps the unit 152 of the next higher article holder while each unit 152 overlaps the unit 151 of the next lower article holder. Accordingly the successive units at the descending side of the apparatus are arranged in staggered relation, and on such side of the apparatus the article holders slope downwardly toward the front of the apparatus as shown in Figure 18. In this connection it will be noted that the right hand end of the article holder in Figure 19 is arranged adjacent the front or discharging face of the apparatus.

The forward end of each unit 151 is provided with a pair of diverging ears 153 and 154, while the rear end of the unit 151 is provided with the downwardly and angularly extending ear 155 (Figure 19). Each of the ears 153, 154 and 155 is provided with an opening, and the opening in each ear 153 is arranged in horizontal alignment with the corresponding ear 155 as indicated by the broken line 156 in Figure 19. Each ear 153 overlaps and has its opening in alignment with the ear 154 of the next higher article holder, and such overlapping openings receive one of the chain link connecting pins 149 of the chain adjacent the front of the apparatus. The opening in each ear 155 receives the corresponding pin 149 of the rear chain 148. Therefore it will be apparent that each article holder is supported at three points, namely, by two of the pins 149 of the forward chain 148 and by one of the pins 149 of the rear chain 148. Accordingly each article holder is bodily held in its proper position with respect to the chains. The alignment of the two chain pins which are in axial alignment with each of the lines 156 (Figure 19) insures the proper passing of each article holder around either pair of sprockets without distortion.

The rear ends of the units of the article holders may be closed as indicated by the numeral 157 (Figure 17) and at its lowermost point on the ascending side of the apparatus, each of the units 151 and 152 being provided with an opening 158 to drain water or other refrigerant from the unit. The forward ends of the units are open as shown in Figures 17 and 20, and since the units are sloped downwardly toward their forward ends on the descending sides of the chains, it will be apparent that any water or other refrigerant remaining in the units will freely drain therefrom on the descending side of the apparatus.

The retaining plate 159 is arranged in the upper casing 134 and a similar guide plate 160 is arranged in the lower casing 135. These retaining plates lie in a common vertical plane parallel to and secured against the inner faces of the two casing sections 134 and 135 and form in effect a single retaining plate with their adjacent edges substantially in contacting relationship as shown in Figure 17. Screws or similar fastening elements 161 may be employed for securing the retaining plates in position. The upper retaining plate 159 is provided with a horizontally elongated opening 162 which is of sufficient width to embrace both units of the successive article holders. Referring to Figure 17 it will be apparent that the height of the opening 162 is approximately equal to the open end of each article holder and since the units of the article holders are arranged in staggered relationship, the successive steps in the movement of the chain, which takes place in a manner to be described, will alternately discharge bottles or other articles from the units 151 and 152.

Any suitable mechanism may be employed for advancing the chains 148 in a step by step movement to move alternate successive units 151 and 152 into registration with the discharge opening 162. A disk 163 is fixed to and rotates with one of the upper sprockets 146 and is provided at its edge with radially extending lugs 164. A lever 165 is pivotally supported at one end by the shaft 144 and is urged upwardly by a suitable spring 166. A handle lever 167 is provided with an angular portion 168 pivoted as at 169 to the free end of the lever 165. The handle lever is provided with a notch 170 engageable with the lugs 164 upon downward movement of the handle lever, this element extending through an opening 171 formed in the side of the upper casing 134 (Figure 15). A torsion spring (not shown) similar to the spring 58 shown in Figures 6 and 8, may be employed for urging the handle lever 167 upwardly toward its normal position. In view of the nature of the chains and associated elements operation of the handle lever 167 will not generate momentum in the parts to tend to carry them beyond their intended positions, and accordingly no means, such as the latch lever 63, previously described, need be provided for normally holding the chains against movement or for preventing the overrunning of the chains. The opening 171 is of such length as to permit the handle lever 167 to move the proper distance to bring the next unit 151 or 152 into registration with the opening 162.

The door 137 is provided with a dispensing opening 172 (Figure 16) normally closed by a pivoted door 173 and through which articles are discharged from the opening 162 to a receiver 174, the door 173 and receiver 174 being similar to the corresponding elements described in connection with the other forms of the invention. The opening 172 obviously is inclined to the same extent as the units 151, the degree of inclination being sufficient to insure the dispensing of the bottles or other articles by gravity as each successive unit 151 or 152 moves into alignment with the opening 162.

The form of the invention shown in Figures 21 and 24 inclusive is identical with the chain type of mechanism just described, except for the specific form of the article holder and the means for securing the article holders to the chains. The modified form of chain mechanism comprises a pair of chains 175 shown as having relatively shorter links than the chains 148, and adapted to pass around sprockets the upper of which is shown in Figure 21 and indicated by the numeral 176. At spaced points in their lengths each chain is provided with special links having outstanding lugs 177, the lugs of the two chains being arranged in aligned pairs as shown in Figure 23, for a purpose to be described.

Each article holder in the form of the invention shown in Figures 21 to 23 inclusive is indicated as a whole by the numeral 178 and comprises units 179 and 180 preferably formed of cast aluminum or a light alloy thereof. Each unit is offset from its associated unit in the same manner as the units 151 and 152 and for the same purpose, namely, to bring alternate units into registration with the vending opening of the retaining plate. Each unit 180 is preferably formed of a plurality of fingers 181. The unit 179 includes a pair of fingers 182 at the side thereof adjacent the unit 180, the opposite side of the unit 179 having a flat wall 183. Both units are provided with end walls 184 (Figure 22) having a central opening 185. The units 179 and 180 are substantially shorter than the units 151 and 152, the openings 185 being provided to receive the necks of bottles which are longer than the units.

Whereas the units in Figure 20 are preferably formed of sheet metal and welded together, thus spacing the inner limits of bottles in the two series of units, the form of the invention in Figure 21 permits the slight nesting of the units with respect to each other, thus economizing in space. In other words, each bottle in the units 180 will extend slightly between the adjacent pair of bottles in the units 179, as will be apparent.

The wall portion 183 of each unit 179 is provided with a groove 186 which is horizontal as indicated in Figure 23, the units themselves sloping, as previously stated, to discharge bottles or other articles therefrom by gravity. Each groove 186 receives a pair of the lugs 177 of the two chains, these lugs being secured in position against the inner face of the grooves by screws 187. Since the chains 175 are retained relatively tight and since the lugs 177 are rigid with their associated links of the chains, the article holders are held in proper positions with respect to the chains. The horizontal alignment of the pairs of links which carry the lugs 177 insures the proper passage of the chains around the sprockets without any tendency to distort the chains, as will be apparent.

The operation of the form of the invention shown in Figures 1 to 9 inclusive and 14 is as follows:

The operator will first fill the apparatus with articles to be dispensed such as bottles of soft drinks. The doors 76 and 77 are opened and through the latter the mechanical elements of the operating lever mechanism will be accessible. As previously stated, the latch member 68 (Figures 6, 7 and 8) is frictionally held in the normal position shown, and the retaining member 63 is prevented from swinging downwardly by the spring 66 and by engagement of the member 70 between the pin 74 and the pawl engaging member 62. By manually turning the latch member 68 in a clockwise direction as viewed in Figure 8, the member 70 may be released from the position referred to, whereupon the holding member 63 may be manually turned downwardly. Thus the carrier will be freely rotatable to facilitate the filling of the article holders.

Through the door 76, the operator may insert bottles in the tubes 28, these tubes sloping downwardly away from the front of the machine on the left hand side of the apparatus as viewed in Figure 2, that is, on the ascending side of the carrier. The bottles are inserted neck first and slide downwardly in the tubes until the ends contact with the rear plate 23. The carrier obviously may be rotated to fill successive article holders and since all of such holders on the ascending side of the carrier slope toward the closed ends of the tubes 28, it is not necessary for the operator to hold the bottles in the tubes. On the descending side of the carrier, the retaining plate 32 will prevent the bottles from sliding from the tubes above and below the opening 36 in the retaining plate.

If it is desired to entirely fill the carrier with bottles, the operator may successively fill the holders at the ascending side of the apparatus, the carrier being turned in a counter-clockwise direction until the first filled holder appears at the bottom of the opening 36. All of the holders available through the door 76 up to the top of the plate 32 then may be filled with the carrier held stationary, whereupon the wheel may be rotated in a clockwise direction until the first bottle at the top of the apparatus appears at the top of the opening 36. Successive bottles then may be inserted into the tubes 28 through the opening 36, and held in position until the carrier is turned in a counter-clockwise direction sufficient to engage the bottle with the back of the plate 32. By continuing this operation, every tube in the apparatus may be filled with the exception of a single tube which will be in alignment with the opening 36. Since the casing of the apparatus is insulated, the air in the top of the apparatus will be chilled and, in time, will chill the bottles which have been inserted above the level of the refrigerant.

If the apparatus is desired to be used relatively soon after filling, the operator may fill only the bottom half of the carrier, all of the bottles initially placed in the apparatus thus being immersed in the refrigerant to be quickly cooled therein. If desired, the operator may fill the bottom half of the apparatus, and after waiting ten or fifteen minutes for the bottles to become chilled he could open the doors 76 and 77 and charge the remaining tubes 28 with bottles, the apparatus being restored to operation with the initially chilled bottles in the top of the carrier.

After the apparatus has been filled with bottles the operator may manually restore the holding member 63 to its normal position shown in Figures 2 and 6 and then swing the latch member 68 back to its normal position, the lug engaging member 65 being positioned in engagement with one of the lugs 49. The apparatus is now ready for operation.

When it is desired to dispense a bottle from the apparatus the operator will grasp the handle 60 and swing it downwardly. The spring 58 is only sufficiently heavy to turn the lever 56 with respect to the lever 50 to normally hold the lever 56 in the position shown in Figure 6. The spring 54 is relatively stronger than the spring 58, and accordingly initial movement of the handle 60 will turn the lever 56 about its pivot 57, while the lever 50 remains stationary, and this operation swings the lug engaging member 62 into engagement with the adjacent lug 49.

Swinging movement of the lever 56 in the manner stated causes the pin 74 to engage against the upstanding member 70 to swing the latch member 63 to release the member 65 from the adjacent lug 49. The member 65 will be fully released from the adjacent lug 49 only after the member 62 has been brought at least into partial engagement with one of the lugs 49. The operation referred to accordingly releases the carrier from the holding member 63 and places it under the control of the operator. The member 70 of the element 68 is normally inclined, but when the member 63 is released from the carrier as described, the portion 70 will lie approximately parallel to the adjacent portion of the periphery of the carrier to permit the pin 74 to move downwardly thereover without excessively swinging the holding member 63, as will become apparent.

The handle lever 56 may be swung until its movement is limited by engagement of the member 62 with the adjacent lug 49 or with the periphery of the forward carrier plate 22. The lever 56 thus is prevented from turning further about its pivot 57 and upon further downward movement of the handle 60, the lever 56, lever 50, and the carrier will turn as a unit about the axis of the supporting shaft 16. As previously stated, the embodiment of the apparatus shown is such that a turning movement of 5 degrees of the carrier moves one tube 28 out of alignment with the dispensing opening and moves the next tube into registration with such opening. The member 70 (Figures 7 and 8) is of the proper length to permit the handle to turn the carrier 5 degrees, and after such turning movement has been performed, the pin 74 will pass below the lower end 72 of the member 70, whereupon the spring 66 will snap the holding member 63 back to its normal position to engage the next lug 49 and prevent further movement of the carrier.

Under such conditions it will be apparent that the carrier will have been turned one step and no further turning movement of the carrier can take place until the handle 60 has been returned to its normal position. It will be noted that when the pin 74 reached the bottom of the member 70, the spring 66 will have returned the member 63 to the position shown in Figure 6. However, the engaging member 62 will still have been in engagement with one of the lugs 49 and the pin 74 will have been arranged at the left side of the member 70 as viewed in Figure 6. When the handle 56 is then released the spring 54 will swing the lever mechanism upwardly. The lever arm 61 is free to turn about the pivot 57 to a sufficient extent to disengage the member 62 from the lug 49 which it previously engaged, and beyond such point, swinging movement of the lever arm 61 will be limited by engagement of the pin 74 against the inner face of the member 70.

With the parts in such position, the spring 54 will swing the lever 50 upwardly, as previously stated, and just before the transverse arm 52 of the lever 50 engages the stop 55, the pin 74 will pass over the upper end 71 of the actuating member 70, whereupon the spring 58 will swing the operating lever 56 upwardly. The stop 55 will then limit upward movement of the lever 50 and the upper end of the opening 59 will limit upward movement of the operating lever 56, all of the parts thus being restored to the position shown in Figure 6, ready for the next operation.

It will be apparent that when the carrier has been advanced one step by operation of the lever mechanism in the manner described, the carrier will be stopped with one of the tubes 28 arranged with its open end in alignment with the opening 36 of the retaining plate. The bottle or other article is then free to slide by gravity through the opening 36, the lowermost bottle in Figure 5 being shown after it has started to move from its tubular member 28. The tubular member thus brought into dispensing position will be arranged in alignment with the openings 36 and 37 and the bottle will slide through the latter opening, the weight and inertia of the bottle being ample for opening the door 43. The bottle will slide downwardly in the receiver until the lower end of the bottle engages the cushion member 42. The bottle then may be picked out of the receiver as will be apparent.

Attention is invited to the fact that ordinary bottle coolers are objectionable for the reason that the bottles are lifted directly from the cooling liquid, and accordingly are delivered to the consumer with water dripping from the bottle. With the present apparatus, the structure of the carrier is such that this objection is completely eliminated. Bottles leave the refrigerant at the side of the apparatus opposite the dispensing point, and accordingly must turn at least 180 degrees around the carrier before being dispensed, and during such time all of the water will drain from the bottle. On the ascending side of the carrier the openings 31 will be arranged at the lowermost points in their respective tubular member 28 to drain water from the tubes. On the descending side of the carrier, the dispensing ends of the tubes are entirely open and accordingly any water remaining therein will be drained from the tubes before the bottles successively reach the dispensing point. Accordingly the bottles will be delivered to the consumer in a dry condition, thus removing one of the principal objections to the use of ordinary bottle coolers.

Moreover the apparatus obviously lends itself readily to the use of a suitable coin control mechanism, although such mechanism obviously forms no part of the present invention and may be of any desired type.

Particular attention is invited to the arrangement of the article holders of the respective rows A, B and C. The arrangement shown is such as to provide for a maximum number of bottle holders in a circular rotatable carrier wherein successive steps for delivering successive bottles are exactly equal to each other. The tubes of the row A are arranged as close together as practicable and as each successive line 46 comes into registration wth the upper limit of the opening 36, a bottle will be dispensed from the row A. The angles between alternate pairs of lines 46 are bisected as at 47 to determine the upper limit of the open end of the tubes of the row B. The angles between the remaining pairs of lines 46 are similarly bisected as at 48 to locate the upper limits of the openings in the dispensing ends of the tubes of the row C. With the arrangement shown, all of the successive steps of movement of the carrier for dispensing successive bottles will be exactly the same.

The form of the invention shown in Figures 10 to 13 inclusive operates substantially in the same manner as the form previously described and need not be referred to in detail. Each lever mechanism operates in exactly the same manner as the lever mechanism previously described, one mechanism being employed for operating the carrier 101 and the other mechanism being employed for operating the carrier 104. Instead of employing a stub shaft as the means for rotatably supporting the carriers, the three rollers 98 are employed for such purpose, these three rollers carrying the weight of both carriers and the articles in the tubular members 107. The outer carrier 104 is rotatably supported with respect to the inner carrier by the rollers 108, these rollers having their ends respectively journaled in the clips 109 and in the plate 110, such means for supporting the rollers 108 being rigid with the carrier 101 and fixing the rollers 108 in proper spaced relation.

As previously stated, both of the lower rollers 98 are arranged above the horizontal plane of the axis of rotation for two reasons. In the first place, this arrangement distributes the weight of the parts among the three rollers and supports the carriers for smooth rotational operation. In the second place, this arrangement permits the carriers to be bodily lifted until the lever rollers 98 are in the horizontal plane of the openings in the plates 102 and 103, whereupon the carriers may be moved forwardly horizontally out of the apparatus. Obviously, the upper casing 81 must be lifted vertically from the lower casing 82 before the carriers may be thus removed. Aside from the structural differences referred to the apparatus shown in Figures 10 to 13 inclusive is similar in operation to the form of the apparatus previously described, the step by step movement of either carrier 101 or 104 delivering articles to the receiver 132. The use of the two carriers permits two different kinds of soft drinks or the like to be handled in a single machine as will be apparent.

The matter of available space is a serious concern in some stores, service stations and other places where an apparatus of the present character is particularly useful. The apparatus shown in Figures 15 to 20 inclusive is particularly advantageous where limited space is available inasmuch as it provides an apparatus which requires little floor space in proportion to the number of bottles it will hold. Instead of employing a rotary carrier, the form of the invention in Figures 15 to 20 inclusive employs article holders connected to vertically arranged endless chains which are adapted to be advanced in a step by step movement. Each article holder comprises a pair of the units 151 and 152 which are offset from each other approximately one-half their width, and accordingly it will be apparent that on the descending side of the apparatus, that is, the right side as viewed in Figure 17, alternate units 151 and 152 will be brought into alignment with the dispensing opening 162 by equal linear steps of travel of the chains 148.

To dispense a bottle from the apparatus it merely is necessary for the operator to grasp the handle 167 and swing it downwardly, the engaging notch 170 first being brought into engagement with one of the lugs 164, whereupon further swinging movement of the lever 167 with respect to the lever 165 will be prevented. Further operation of the handle will then cause the lever mechanism and the disk 163 to rotate as a unit about the axis of the shaft 144. The length of the opening 171 (Figure 15) is such as to limit the travel of the handle 167 the proper distance to move the chains 148 one step and thus bring one of the units 151 or 152 into alignment with the dispensing opening 162 and thus dispense a bottle from the apparatus.

It will be apparent that all of the mechanism of the apparatus shown in Figures 15 to 20 inclusive is supported solely by the upper casing section 134, the lower ends of the chains passing around sprockets 147 carried by the lower bracket section 141 which is free from the lower casing section 135. Accordingly the upper casing section 134 may be lifted vertically from the lower casing section for disconnecting any of the parts from the latter. As is true in the other forms of the invention described, the lower casing section may be made without any doors or other means for providing access thereto from the outside and from which leakage of the refrigerant might occur.

As is true in the other forms of the invention described, the article holders slope downwardly away from the open ends thereof on the ascending side of the apparatus, and each unit 151 and 152 is provided with a drain opening 158 to drain refrigerant from the article holders on the ascending side of the apparatus. The liquid is free to drain from the open ends of the article holders on the descending side of the apparatus, and on the latter side, the bottles engage the retaining plate 159 to be held in their respective holders until they are successively brought into alignment with the dispensing opening 162.

In Figures 21 to 24 inclusive a modified form of article carrier for the chain type dispensing apparatus is shown. The article holders 150 in the form of the invention just described may be made of sheet metal with the units of each article holder welded or riveted together. In the form of the invention shown in Figures 21 to 24 inclusive the article holders may be made preferably from cast aluminum. Under such conditions each of the units may be formed with its sides made up of the fingers, as shown, thus greatly facilitating the drainage of refrigerant from the article holders. Moreover, each article holder may be cast with its two units integral with each other and in such case the relationship of the units may be such as to reduce the width of each unit in the manner previously described.

The bottle holding units 150 and 178 are both connected to their chains in such a manner as to facilitate the passing of the article holders around the sprockets. The line 156 in Figure 19 indicates the alignment of the pivots of the links connected to one of the article holders to permit the latter to pass smoothly around the sprockets without any binding action. The same result is accomplished with the arrangement shown in Figure 23 wherein the arrangement of the lugs 177 in the horizontal slot 186 pivots each carrier on a horizontal axis for proper movement around the sprockets, the article holders themselves being inclined in order to discharge articles from the apparatus by gravity as will be apparent.

Each form of the apparatus is particularly efficient in operation and is comparatively simple in construction. Each form of apparatus lends itself particularly well to the use of a coin control mechanism whereby the apparatus may be placed in stores where clerks frequently are too busy to render efficient service in the dispensing of soft drinks, or in automobile service stations wherein attendants are not always available for dispensing soft drinks. In each form of the invention a simple step by step movement dispenses successive bottles, and in each form the bottle holders quickly and readily may be filled with bottles when desired.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. A dispensing apparatus comprising a movable carrier having a plurality of rows of article holders, retaining means adjacent said carrier and extending through a portion of the path of travel of the article holders, said article holders being constructed and arranged to support articles therein in a position sloping downwardly toward said retaining means during said portion of the path of travel of said article holders whereby the articles will gravitate into engagement with said retaining means, said retaining means having an opening elongated transversely of the paths of travel of the article holders past such opening and such opening being of such a length as to embrace article holders of the several rows, the article holders of the several rows being so staggered with relation to each other that given equal steps of movement of said carrier will bring successive article holders into registration with the opening in said retaining means, and means for moving the article holders successively through said given steps.

2. A dispensing apparatus comprising a movable carrier having a plurality of rows of article holders, and retaining means arranged adjacent said carrier and extending through a portion of the path of travel of said article holders, said article holders sloping downwardly toward said retaining means during the portions of their paths of travel past said retaining means whereby articles in said holders will gravitate into engagement with said retaining means, said retaining means having an opening elongated transversely of the paths of travel of said article holders past such opening and such opening being of such a length as to embrace article holders of the several rows, the article holders of the several rows being so staggered with relation to each other that equal steps of movement of said carrier will bring successive article holders into registration with the opening in said retaining means.

3. A dispensing apparatus comprising a casing formed of upper and lower members, a movable carrier mounted in said casing and supported solely by the upper member thereof, a series of article holders carried by said carrier, and retaining means within said casing and supported wholly by the upper member thereof, said retaining means being arranged adjacent said carrier and extending through a portion of the path of travel thereof, said article holders having open ends extending to the side of the carrier adjacent said retaining means, and said retaining means having an opening therein with which the open ends of said article holders are adapted to successively register upon movement of said carrier, said article holders being constructed and arranged to support holders therein in a position sloping downwardly toward said retaining means in the portion of the path of travel of said article holders adjacent said retaining means whereby articles will gravitate into sliding engagement with said retaining means to be discharged through the opening therein as they come into registration therewith, said casing being provided with an opening registering with the opening in said retaining means at an angle corresponding to said slope of the articles.

4. A dispensing apparatus comprising a casing formed of upper and lower complementary sections, a movable carrier movable in said casing and supported solely by the upper section thereof, a series of article holders carried by said carrier, and retaining means arranged within said casing and supported wholly by the upper section thereof, said retaining means being arranged adjacent said carrier and extending through a portion of the path of travel thereof, said article holders having open ends extending to the side of the carrier adjacent said retaining means and said retaining means having an opening therein with which the open ends of said article holders are adapted to successively register upon movement of said carrier, said article holders sloping downwardly toward their open ends in the portion of the path of travel of said article holders adjacent said retaining means whereby the articles will gravitate into sliding engagement with said retaining means until they move successively into registration with the opening therein, the upper casing section being provided with an opening registering with the opening in said retaining means at an angle corresponding to said slope of said article holders.

5. A dispensing apparatus comprising a casing formed of upper and lower complementary casing sections, an article carrier formed as an endless conveyor and arranged in said casing, sprockets arranged at different levels in said casing and around which said conveyor passes, means carried solely by said upper casing section for rotatably supporting said sprockets, said upper casing being provided with a dispensing opening, said carrier being constructed and arranged to support articles in a position sloping downwardly toward said opening to tend to discharge articles through said opening, and means supported solely by said upper casing for retaining articles in said carrier until the articles reach said opening and then releasing them to be dispensed through said opening.

6. A bottle dispensing apparatus comprising a vertical casing divided intermediate its height to form upper and lower casing sections, a carrier in said casing having a plurality of rows of article holders, means for supporting said carrier solely by said upper casing section for movement in said casing, and retaining means carried wholly by said upper casing section arranged adjacent one side of said carrier and extending through a portion of the path of travel thereof, said bottle holders sloping downwardly toward said retaining means during the portions of their paths of travel past said retaining means whereby bottles in said holders will gravitate into engagement with said retaining means, said retaining means and said upper casing section having openings elongated transversely of the path of travel of said bottle holders past such openings and being of such length as to embrace bottle holders of the several rows, the article holders of the several rows being so staggered with relation to each other that equal steps of movement of said carrier will bring successive bottle holders into registration with the openings in said retaining means and said upper casing section.

7. A dispensing apparatus comprising a vertical casing divided intermediate its height to form upper and lower casing sections, a bottle carrier in said casing formed as an endless conveyor, a pair of sprockets arranged in a vertical plane in said casing and around which said conveyor passes, means carried solely by said upper casing section for rotatably supporting said sprockets, a plurality of bottle holders carried by said conveyor and each comprising a plurality of bottle holding units, and retaining means extending along and parallel to one run of said conveyor and carried solely by said upper casing section, said article holding units in said run of said conveyor sloping downwardly toward said retaining means, said retaining means and said upper casing section being provided with dispensing openings registering with each other at an angle corresponding to said slope of said article holders, said openings being of such length as to embrace the paths of travel of all of said bottle holding units, the units of each bottle holder being staggered with relation to each other and with relation to the units of the adjacent holders so as to dispense successive bottles through said openings upon equal steps of movement of said conveyor.

8. A dispensing apparatus comprising a carrier, means for supporting said carrier for rotation on a substantially horizontal axis, said carrier having a plurality of circularly arranged rows of article holders, each row being concentric with said axis, the article holders of one row being arranged in relatively close relationship to each other, another row of article holders being so arranged that a radius from said axis through a predetermined point with respect to each holder of such row will bisect the angles between alternate pairs of radii passing through corresponding points with relation to the respective article holders of said first named row, a third row of article holders being so arranged that a radius from said axis through the same corresponding point with respect to each holder of such third row will bisect the angles between the remaining pairs of said radii passing through the article holders of said first named row, all of said article holders being angularly arranged with respect to said axis of rotation whereby each article holder, when at one side of said carrier, will slope downwardly toward one end to tend to discharge an article therefrom by gravity.

JOHN BUFORD BROCK.